June 14, 1960  W. GIERKE ET AL  2,940,416
REVERSE SIGNALING DEVICE FOR VEHICLES
Filed Feb. 24, 1959
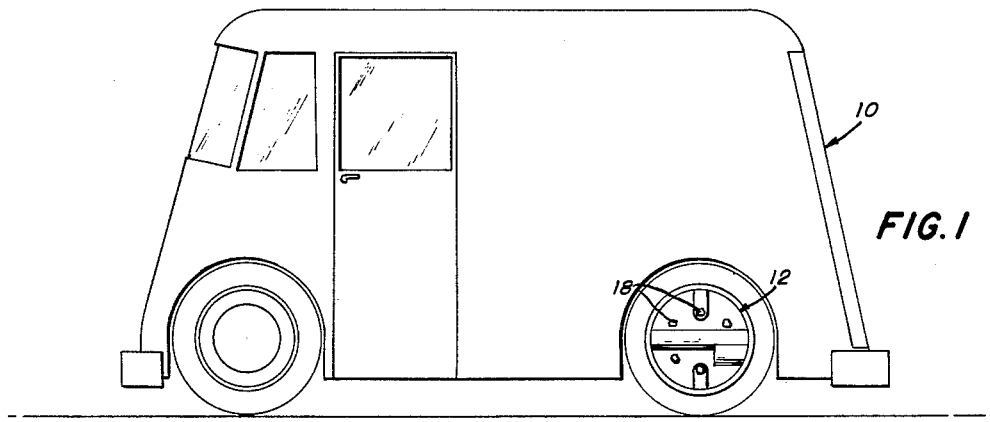
FIG.1
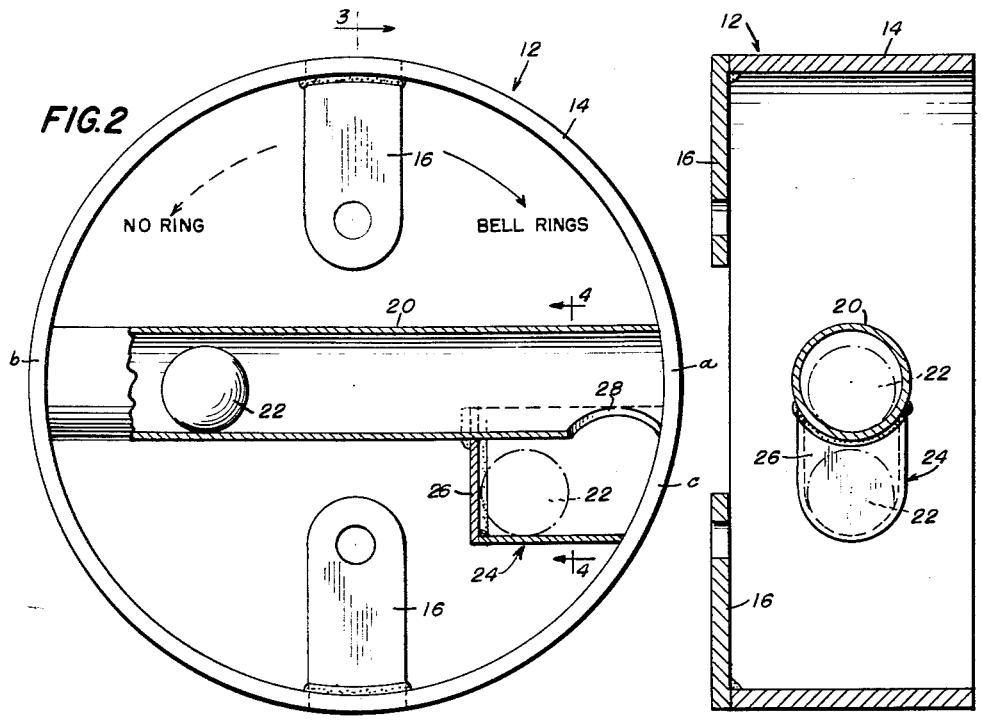
FIG.2
FIG.3
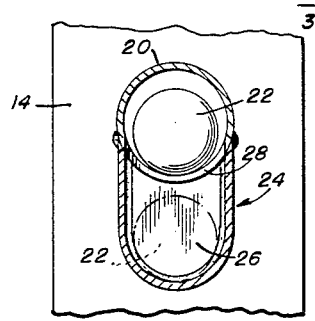
FIG.4
INVENTORS
WAYNE GIERKE
FRANK L. GUYER
BY Beale & Jones
ATTORNEYS – # United States Patent Office

2,940,416
Patented June 14, 1960

2,940,416

REVERSE SIGNALING DEVICE FOR VEHICLES

Wayne Gierke and Frank L. Guyer, both of 650 Newmark, Empire, Oreg.

Filed Feb. 24, 1959, Ser. No. 794,948

2 Claims. (Cl. 116—28)

This invention relates to a reverse signaling device for vehicles. More specifically, this invention relates to a device which will utter an audible signal when the vehicle moves in a reverse direction.

In the prior art there are several devices adapted for attachment to a rotatable element to indicate audibly when the element rotates. One such device is shown in the Letters Patent 2,495,698, to Chilson, granted by the United States Patent Office on January 31, 1950. This device includes a circular bell having a pipe disposed along a diameter thereof. A ball is movable in the pipe and the device is attached to a rotatable element. As the element rotates, the ball rolls in the pipe from one end to the other, repeatedly hitting alternate sides of the bell creating an audible signal.

It is an object of this invention to provide an improved signaling device which when attached to a rotatable element utters a signal only when the element rotates in a certain direction.

It is a further object of this invention to provide a sturdy, rugged device of inexpensive construction and foolproof operation.

This invention embodies other novel features, details of construction and arrangement of parts which are hereinafter set forth in the specification and claims, and illustrated in the accompanying drawing, wherein:

Fig. 1 is a side elevation of a vehicle having an embodiment of the device of the invention attached to a rear wheel thereof;

Fig. 2 is an enlarged front view of an embodiment of the device of the invention, partly in section;

Fig. 3 is a sectional view taken on the line 3—3 of Fig. 2; and

Fig. 4 is a fragmentary sectional view taken on the line 4—4 of Fig. 2.

Briefly, in an alarm device adapted for attachment to and rotation with a rotatable element, said device including a bell having a pipe mounted along a diameter thereof, the pipe supporting a movable ball adapted as the device rotates to strike alternate sides of the bell, the invention is a trap member mounted against the side pipe at one end thereof. An opening in the pipe communicates to the trap member, and when the device is rotated in a certain direction, the ball falls into the trap member and there remains noiselessly confined as rotation in that direction continues. When, on the other hand the device rotates in the opposite direction, the ball rolls out of the trap member into the pipe and functions as the devices of the prior art.

More specifically, referring to the drawings, Fig. 1 shows a truck generally designated 10. To its rear left wheel is attached an embodiment of the device 12 of the invention. The device comprises a bell 14 having a circular wall of curved metal plate or the like. Extending inwardly from diametric opposite points on the inside of the bell are a pair of ears 16, each of which is apertured toward its inward end. These apertures receive the fasteners which secure the vehicle wheel to the hub. More than two ears may be provided on the bell to assure secure fastening if desired.

Extending along a diameter of a cylindrical wall portion of the bell is a pipe 20 (see Fig. 2). The pipe 20 may be held in position by being secured at either end to the inside of the wall of the bell. Alternately the pipe may be held at its middle by means extending inwardly from the ears 16. In the last embodiment, the ends of the pipe do not contact the inside wall of the bell. Movably supported within the pipe is a ball 22. The ball is sufficiently smaller than the inside diameter of the pipe so that it is free to roll therein. It may thus be seen that if the device in Fig. 2 is mounted on a rotatable wheel and rotated in a clockwise direction, the ball repeatedly will strike alternate sides of the bell.

The improvement which constitutes our invention is a trap member 24. It is situated adjacent one end of the pipe 20 and comprises as shown in Fig. 4 a downward appendage which is hollow and large enough to receive the ball 22. Trap member 24 is preferably U-shaped in cross section as shown in Fig. 4 and is secured to the underside of the pipe 20. At its inner end, the trap member includes an end wall portion 26 depending also from the underside of the pipe 20.

As seen in Fig. 2 an opening 28 at the end of the pipe into the trap member 24 permits passage of the ball 22. This opening is positioned at the extreme end of the pipe. It is noted that the end wall portion 26 of trap member 24 is spaced a distance from the opening 28 toward the center of the bell to permit the trap to receive the ball in that direction at least to a point where the center of the ball is positioned toward the inside of the bell from the edge of the opening 28. The distance, logically, is at least as great as the radius of the ball. This, as can be visualized, permits the ball 22 (represented by dotted lines) to be still supported in the trap member 24 when the device is rotated to a position 180° in a counterclockwise direction from that position shown in Fig. 2.

With the foregoing explanation of the structure of the device of our invention, its operation will be obvious. It will be understood that when the vehicle 10 travels in a forward direction, there will be no need for an alarm; and that when the vehicle travels in a reverse direction and the vision of the driver is impaired the audible signal will be needed. Keeping this in mind, it will be seen that when the structure as shown in Fig. 2 rotates in a clockwise direction, the ball (represented by a solid line) will roll down the pipe and strike the bell at $a$. Rotation continuing, the ball will roll along the pipe to strike the bell at $b$ and so on. If, however, the device is rotated in a counter-clockwise direction, the ball will, as shown in Fig. 2 first roll down and strike the bell at $b$. It will then roll in a reverse direction with respect to pipe 20 to strike the bell at $a$. The rotation continuing, the ball will roll along the inside of the bell through the opening and into the trap member 24. It will then roll in the trap member 24 to the end wall portion 26 thereof and continuously back and forth inside the small confine of the trap member 24 as the counter-clockwise rotation of the device continues. This confine is so small that the ball's striking the bell at $c$ will be almost inaudible.

It will also be understood that the bell will not ring when the vehicle runs rearwardly at a considerable rate of speed. This is because the rapid rotation of the device in Fig. 2 will cause the ball to cling by centrifugal force to the bell wall at either $a$ or $b$.

While this invention has been shown in but one form, it is obvious to those skilled in the art that it is not so limited but is susceptible of various changes and modifications without departing from the spirit and scope of the claimed invention.

We claim:

1. In an alarm device adapted for attachment to and rotation with a rotatable element, said device providing an audible signal in rotation of said element and comprising a bell, a pipe mounted in said bell with the axis of said pipe extending across the interior of said bell, a relatively movable ball supported within said pipe; the improvement of a trap member large enough to receive said ball, said trap member being positioned under and adjacent one end of said pipe, said trap member having its upper wall extending in the same direction as said pipe and adapted to be engaged by said ball, said pipe having at the said end an opening into said trap member to permit passage of said ball, and said trap member having an end wall portion spaced from said opening a distance toward the opposite end of the pipe equal at least to the radius of the ball.

2. In an alarm device adapted for attachment to and rotation with a rotatable element, said device providing an audible signal in rotation of said element and comprising a bell having a circular wall portion, a pipe mounted in said bell with the axis of said pipe extending approximately along a diameter of said circular wall portion, a relatively movable ball supported within said pipe; the improvement of a trap member of U-shape cross-section large enough to receive said ball, said trap member being secured along its upper edges to the underside of one end of the pipe, the underside of the pipe extending in the same direction as the axis of the pipe and comprising the upper wall of said trap member, said ball being adapted to engage the upper wall of said trap member, said pipe having at its extreme the said end an opening into said trap member to permit passage of said ball, said trap member having an end wall portion spaced from the said opening a distance toward the opposite end of said pipe equal at least to the radius of the ball, whereby as said device is rotated in one direction the ball rolls back and forth the length of the pipe and repeatedly audibly strikes alternately opposite points on the bell, and as said device is rotated in the opposite direction said ball passes through said opening into said trap and is confined relatively noiselessly therein.

References Cited in the file of this patent
UNITED STATES PATENTS 1,905,261     Bernstrom _____ Apr. 25, 1933

UNITED STATES PATENT OFFICE
CERTIFICATE OF CORRECTION

Patent No. 2,940,416 June 14, 1960

Wayne Gierke et al.

It is hereby certified that error appears in the printed specification of the above numbered patent requiring correction and that the said Letters Patent should read as corrected below.

Column 2, line 7, for "Alternately" read -- Alternatively --; column 4, line 9, strike out "its extreme".

Signed and sealed this 8th day of November 1960.

(SEAL)
Attest:
KARL H. AXLINE
Attesting Officer

ROBERT C. WATSON
Commissioner of Patents